US007366972B2

(12) United States Patent
Baumert et al.

(10) Patent No.: US 7,366,972 B2
(45) Date of Patent: Apr. 29, 2008

(54) DYNAMICALLY MEDIATING MULTIMEDIA CONTENT AND DEVICES

(75) Inventors: David W. Baumert, Sammamish, WA (US); Flora P. Goldthwaite, Seattle, WA (US); Gregory L. Hendrickson, Seattle, WA (US); Jonathan Cluts, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 11/117,571

(22) Filed: Apr. 29, 2005

(65) Prior Publication Data

US 2006/0248441 A1 Nov. 2, 2006

(51) Int. Cl.
*G06F 15/00* (2006.01)
(52) U.S. Cl. ..................................................... 715/200
(58) Field of Classification Search ............. 715/500.1, 715/723, 500; 707/5
See application file for complete search history.

(56) References Cited

U.S. PATENT DOCUMENTS

| 5,786,823 | A | * | 7/1998 | Madden et al. .............. 345/591 |
| 5,956,044 | A | * | 9/1999 | Giorgianni et al. .......... 345/590 |
| 6,198,500 | B1 | * | 3/2001 | Watanabe et al. ............ 725/105 |
| 6,208,428 | B1 | * | 3/2001 | Chihara et al. ............. 358/1.15 |
| 6,928,262 | B1 | * | 8/2005 | Kanemitsu .................. 455/3.06 |
| 7,085,761 | B2 | * | 8/2006 | Shibata ........................ 707/5 |
| 2001/0054180 | A1 | * | 12/2001 | Atkinson ...................... 725/32 |
| 2002/0011951 | A1 | * | 1/2002 | Pepin et al. ............. 342/357.13 |
| 2002/0106193 | A1 | * | 8/2002 | Park et al. ..................... 386/95 |
| 2004/0083015 | A1 | * | 4/2004 | Patwari ........................ 700/90 |
| 2006/0020973 | A1 | * | 1/2006 | Hannum et al. ............... 725/46 |
| 2006/0031882 | A1 | * | 2/2006 | Swix et al. .................... 725/46 |
| 2006/0075460 | A1 | * | 4/2006 | Anegawa et al. .............. 726/1 |
| 2006/0107194 | A1 | * | 5/2006 | Gale ........................... 715/500 |
| 2006/0242129 | A1 | * | 10/2006 | Libes et al. .................... 707/3 |
| 2006/0280075 | A1 | * | 12/2006 | Kanegae et al. ......... 369/47.21 |
| 2007/0031116 | A1 | * | 2/2007 | Takatsuka et al. ............ 386/95 |
| 2007/0055566 | A1 | * | 3/2007 | Gaughan et al. .............. 705/14 |
| 2007/0118521 | A1 | * | 5/2007 | Jatowt et al. .................. 707/5 |
| 2007/0124796 | A1 | * | 5/2007 | Wittkotter .................... 725/136 |

OTHER PUBLICATIONS

Ohshima et al., The Parks PDA: A Handheld Device for Theme Park Guests in Squeak, ACM 2003, pp. 370-380.*
Yin et al., Using Link Analysis to Improve Layout on Mobile Devices, ACM 2004, pp. 338-344.*
Jain, Improving Quality of Service for Streaming Multimedia Applications in Ubiquitous Mobile Enviornment, ACM 2005, pp. 2-14 to 2-19.*
Song et al., Learning Important Models for Web Pages Blocks based on Layout and Content Analysis, ACM Dec. 2004, pp. 14-23.*

* cited by examiner

*Primary Examiner*—Cong-Lac Huynh
(74) *Attorney, Agent, or Firm*—Shook, Hardy & Bacon, LLP

(57) ABSTRACT

A mediator having at least a ranking component, a listening component, and a control component, selectively controls a group of devices from a plurality of network devices in a network environment to reproduce multimedia content. The mediator correlates the multimedia content with the plurality of network devices. The listening component collects data about the network environment to enhance a user's experience with the multimedia content. The mediator utilizes the network environment data and the correlation of the multimedia content and the plurality of network devices to automatically select the group devices from the plurality of network devices that maximize a user's viewing or listening pleasure when reproducing the multimedia content on the group of devices.

24 Claims, 9 Drawing Sheets

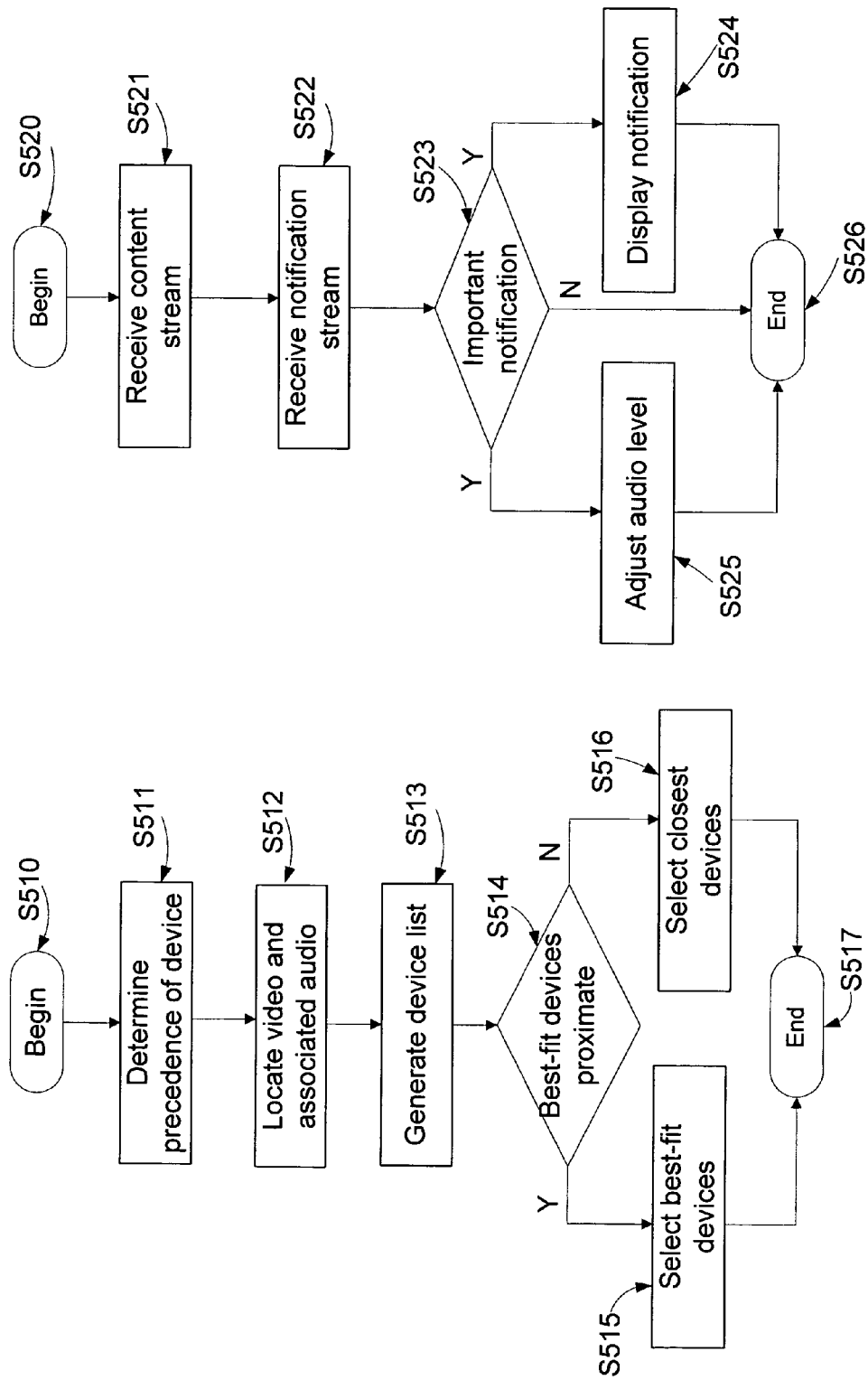

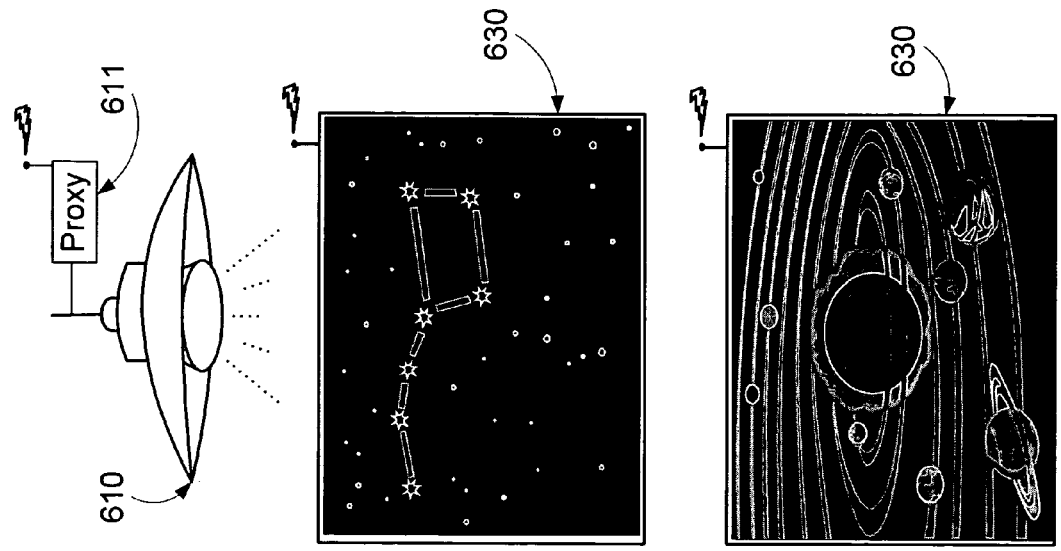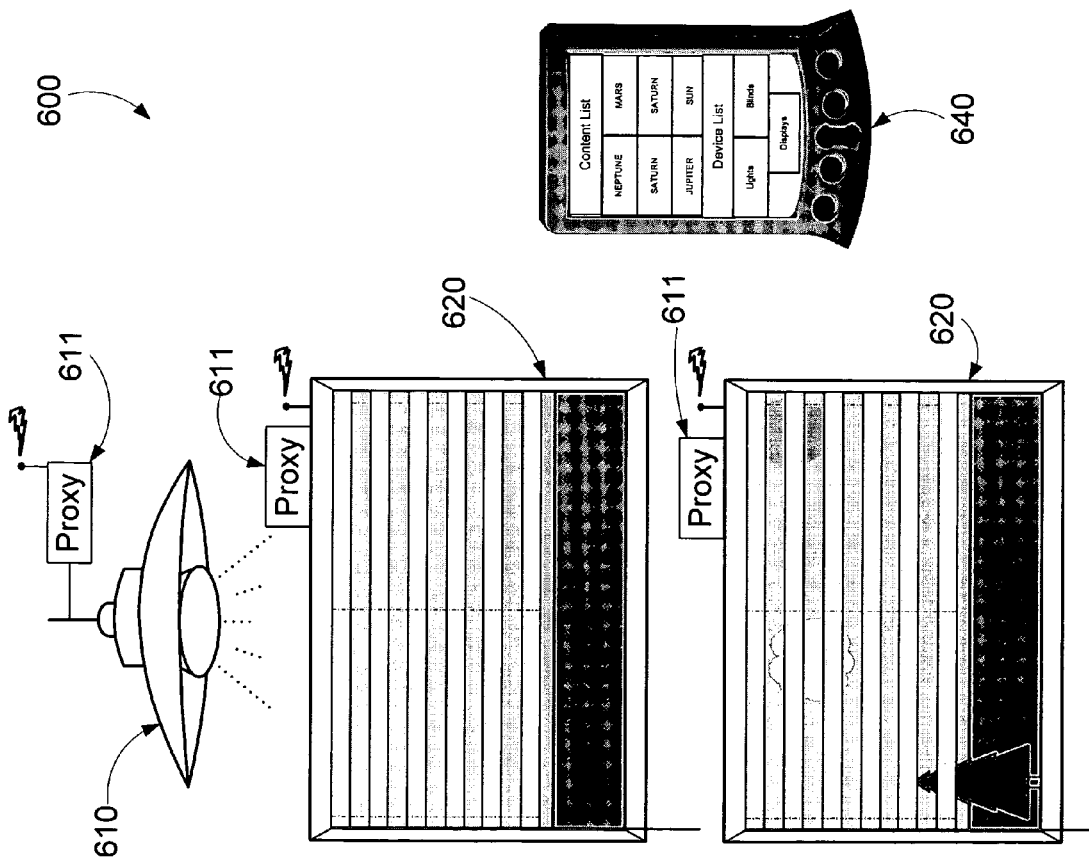
FIG. 6

DYNAMICALLY MEDIATING MULTIMEDIA CONTENT AND DEVICES

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

Embodiments of the present invention relates generally to the field of content delivery. More specifically, embodiments of the present invention provide a mediation service to select a device well suited to present the content, such that a user's experience of the content is maximized.

BACKGROUND OF THE INVENTION

Currently, when a new computer having a unique configuration is introduced to a network of computers, often the new computer can not communicate with other computers on the network without a lengthy and tedious configuration process, where a developer creates specialized scripts that enable the new computer to communicate with the other computers on the network. Additionally, after the new computer is configured to communicate with other computers, a device configuration in the new computer is usually static. For example, when the new computer is configured, using wires, to send an audio signal to a pair of speakers connected to a speaker output jack of the new computer, the connection will remain constant until the device configuration is changed by a user. If an external speaker that is not connected to the new computer is better suited to process the audio signal, the new computer will not send the audio signal to the external speaker because the device configuration does not enable the new computer to communicate with the external speaker. Accordingly, a user has to manually change the device configuration to utilize the external speaker.

Therefore, a need arises to provide a service that allows computers to dynamically communicate with devices without requiring a developer to create specialized scripts or to manually configure the devices. Moreover, it would be advantageous for the service to allow computers having different formats to freely exchange content to maximize a user's experience in a network environment by efficiently utilizing devices that enhance the user's experience.

SUMMARY OF THE INVENTION

These and other problems, in the art, are solved by a mediator that provides a mediation service to maximize a user's experience in a network environment by determining a best-fit match between content and a plurality of devices in the network environment.

The mediator includes at least a ranking component, a listening component, and a control component. The ranking component assigns values, indicating importance, to the content and the plurality of devices. The listening component collects information about device offerings, from the plurality of devices; collects information about content preferences, from either content metadata or a device storing the content; and collects information about changes in the network environment. The control component specifies the level of user involvement, which is default to no user involvement. The mediator utilizes the information provided by the control, listening and ranking components to automatically select a group of suitable devices from the plurality of devices to reproduce the content.

Also, the mediator may provide an arbitration component to resolve device conflicts. The arbitration component includes a set of rules that evaluates the device offerings provided by the plurality of devices or the values assigned to the plurality of devices when resolving device conflicts.

The network environment includes a plurality of devices capable of communicating wirelessly. A first communication device of the plurality of devices receives streaming content from a content source and reproduces the content. A second communication device of the plurality of devices receives content different from the content of the first communication device and reproduces the different content. When the first communication device comes into proximity with the second communication device a mediator is initiated to determine whether the content being reproduced by the first communication device should take precedence over the different content being reproduced on the second communication device.

The mediator determines a best-fit match between content and a plurality of devices in the network environment by mining for relationships between content and the plurality of devices. The method for mining relationships includes receiving content information, receiving device information, and correlating the content information and the device information. The relationships discovered include content-content, relationships between different content, content-device, relationships between a device and content, and device-device relationships, relationships between different devices, are stored by the mediator to facilitate quicker communication between the plurality of devices.

Additional advantages and novel features will be set forth in the description which follows and in part may become apparent to those skilled in the art upon examination of the following or may be learned by practice of the invention.

BRIEF DESCRIPTION OF THE DRAWINGS

FIGS. 5A and 5B are flow diagrams of embodiments of the present invention that illustrates a method to resolve device contention and a method to resolve content contention;

FIG. 6 is a network schematic that illustrates a network environment that provides a dynamic user interface to control devices in the network environment;

DETAILED DESCRIPTION OF EMBODIMENTS

The present invention provides a mediator to efficiently conduct communication between various devices. The mediator enables a communication network that transports content, including video and audio, to efficiently utilize devices based on device offerings and content preferences. In one embodiment of the present invention, the devices are capable of communicating wirelessly and include devices such as smart phones, speakers, lights, projectors, laptops, monitors, personal digital assistants, etc. These devices are utilized such that a user's experience with the content is maximized.

Figure 1:
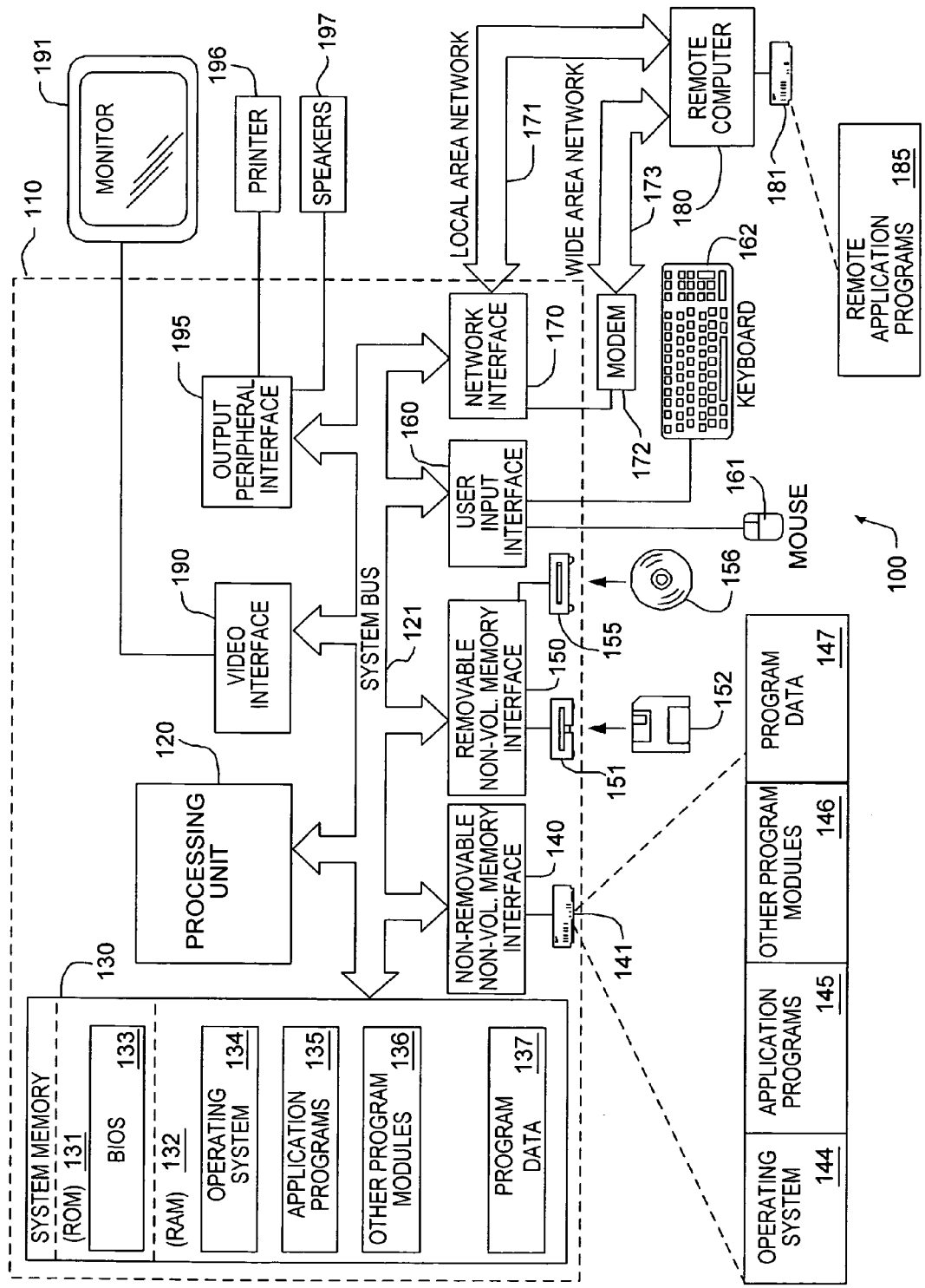
FIG. 1 is a block diagram that illustrates a computing environment adapted to implement the present invention.

FIG. 1 is a block diagram that illustrates a computing environment adapted to implement the present invention. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

The present invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect Express (PCI Express) and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The wireless communication media may be networks such as for example, Bluetooth or 802.11 networks. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the processing unit 120 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks, such as wireless networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
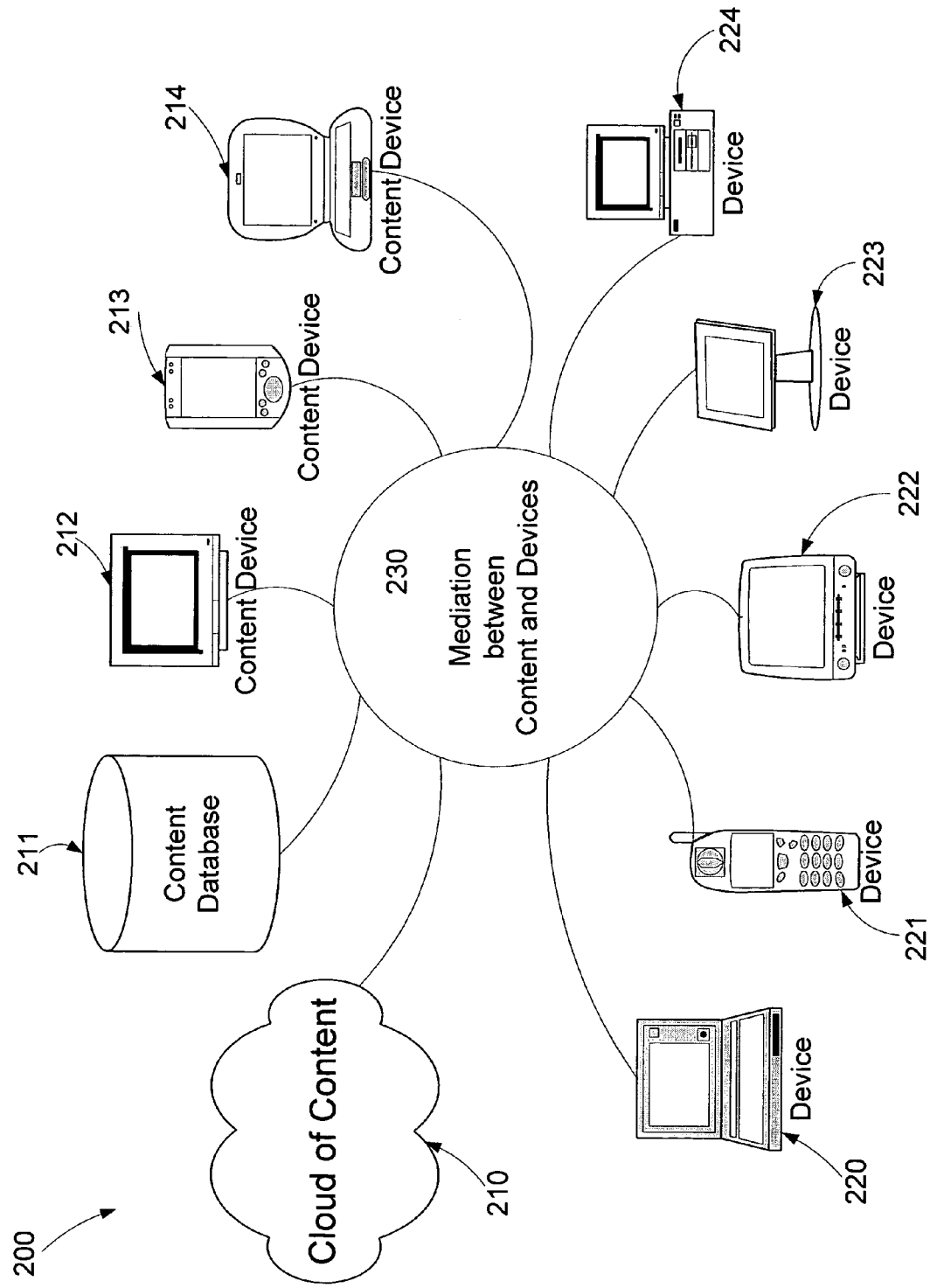
FIG. 2 is a network schematic of an embodiment of the present invention that illustrates a plurality of network devices in communication with a mediator.

FIG. 2 is a network schematic of an embodiment of the present invention that illustrates a plurality of intelligent network devices 212-214 and 220-224 in communication with a mediator 230.

With reference to FIG. 2, a network 200 includes the mediator 230, a content cloud 210, a content database 211, content devices 212-214 and devices 220-224.

The mediator 230 enables the network devices 212-214 and 220-224 to communicate with each other without preconfiguring each device. The mediator 230 is discussed in more detail with reference to FIG. 3.

The content cloud 210 represent a content source such as the Internet, where content exists at various locations across the globe. The content includes multimedia content such as audio and video. The mediator allows the content cloud 210 to provide content to devices 220-224.

The content database 211 is a storage device that maintains content. The content database 211 may be a stand-alone device on an external communication network. The mediator 230 communicates with the content database 211 to access and retrieve content.

The content devices 212-214, include intelligent devices, such as, for example, personal computers, laptops and personal digital assistants. The content devices 212-214 are capable of storing content information.

The devices 220-224 are intelligent devices that receive content from a content source 210-214. Here, the devices 220-224 are operating as client devices and receive content stored on a content source 210-214. However, the devices 220-224 can also operate as servers to distribute content to other client devices.

In another embodiment of the present invention, the network 200 may be a network environment that includes non-intelligent devices.

FIG. 6 is a network schematic that illustrates a network environment 600 that provides a dynamic user interface device 640 to control devices 610-630 in the network environment 600. The mediator 230 wirelessly communicates with the dynamic user interface device 640 and devices 610-630 to provide a content list and device list on the dynamic user interface device 640.

The devices 610-630 include, light devices 610, proxy devices 611, blind devices 620 and display devices 630. The light devices 610 and the blind devices 620 are non-intelligent devices and the display devices 630 and the dynamic user interface device 640 are intelligent devices. The display devices 630 may include projectors, monitors, wide screen televisions, laptops, etc. The dynamic user interface device 640 may include portable devices such as, personal digital assistants, cell phones, etc. The light devices 610 and blind devices 620 control the ambient light in the network environment 600. The proxy devices 611 provide information about the non-intelligent devices' status and capabilities to the mediator 230, collect environment information, and receive commands from the dynamic user interface device 640 to control the non-intelligent devices 610 and 620.

Figure 7:
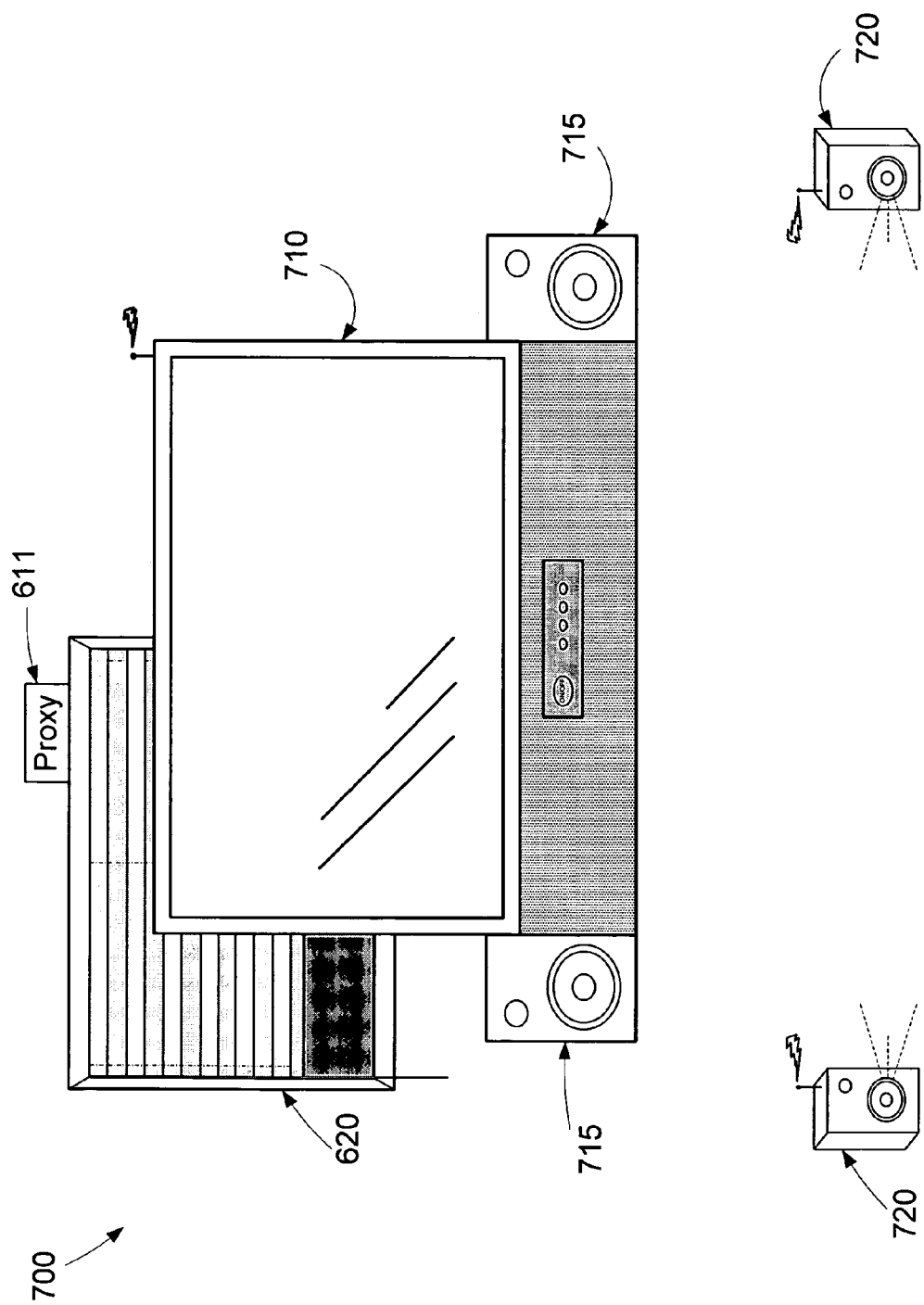
FIG. 7 is a network schematic that illustrates a network environment including a blind device, external speakers and a wide screen television having internal speakers that utilizes the functionality provided by the mediator of FIG. 2.

FIG. 7 is a network schematic that illustrates a network environment 700 including a blind device 620, external speakers 720 and a wide screen television 710 having internal speakers 715 that utilize the functionality provided by the mediator 230 of FIG. 2. The external speakers 720 and internal speakers 715 reproduce audio content. The wide screen television 710 reproduces video content. The external speakers 720, internal speakers 715, blind device 620 and wide screen television 710 communicate wirelessly to determine optimal operating conditions for content currently reproduced by wide screen television 710, external speakers 720 and internal speakers 715. For example, the mediator 230 may determine that the wide screen television 710 is reproducing content, such as, for example a horror film, that prefers a dark environment. Accordingly the mediator 230 may reduce ambient light by communicating with a proxy device 611 to close the blind 620.

Figure 3:
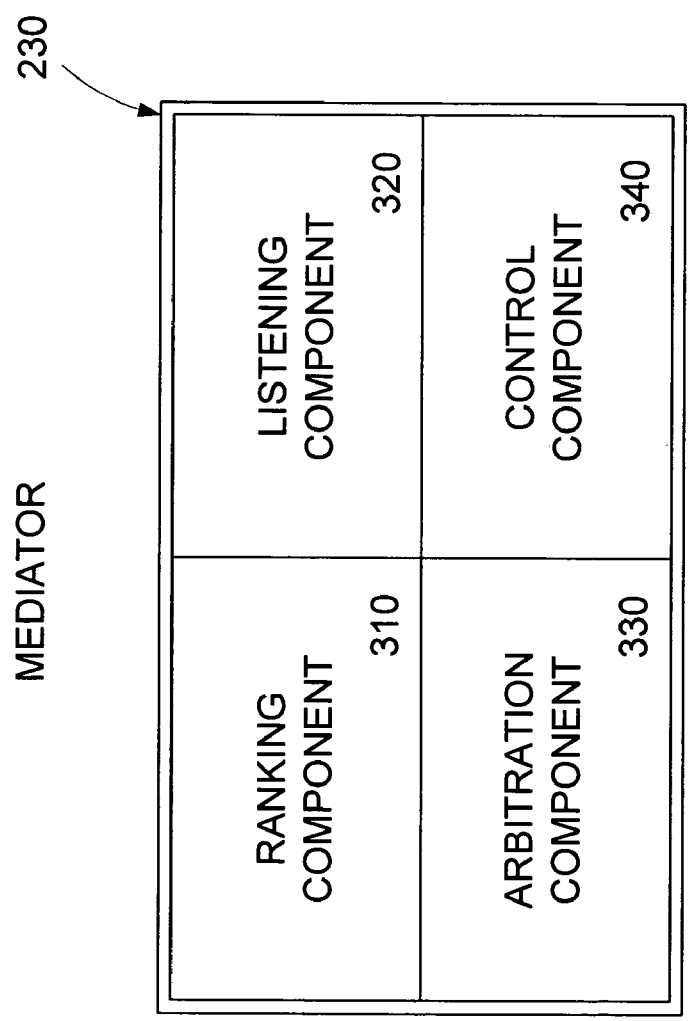
FIG. 3 is a component diagram of another embodiment of the present invention that illustrates a plurality of components that provide the functionality of the mediator of FIG. 2.

FIG. 3 is a component diagram of another embodiment of the present invention that illustrates a plurality of components 310-340 that provide the functionality of the mediator 230 of FIG. 2.

The mediator 230 includes a ranking component 310, a listening component 320, an arbitration component 330 and a control component 340.

The ranking component 310 assigns values, indicative of importance, to content or to a device sending or receiving the content. The values may be assigned based on business rules or relevancy. The business rules may define which devices have priority when multiple devices are attempting to distribute content to a common device. For example, a door bell device sending a notification to a display device may take priority over a movie streaming on the display device depending on the time of day.

The listening component 320 collects information from the content and the devices. The information collected from the content may include metadata such as R-G-B values, author, size, optimal display and audio settings, etc. The device information may include attributes describing device offerings and capabilities, such as stereo, color, location, size of display, etc.

The arbitration component 330 resolves device or content conflicts. The arbitration component 320 utilizes the values assigned to the content and devices to decide which content is reproduced and which devices are utilized to reproduce the content. The arbitration component 330 may be configured to remedy device conflicts or content conflicts, or both.

The control component 340 specifies the level of user involvement for the mediator. This enables the mediator to either run automatically, with no user intervention, or to interact with the user to make decisions of where and how to reproduce the content.

It should be noted that the mediator might be mobile code distributed across the network. Each network device may run a mediator agent that implements one or more of the components described above. The mediator may also be part of the content.

Figures 4A, 4B:
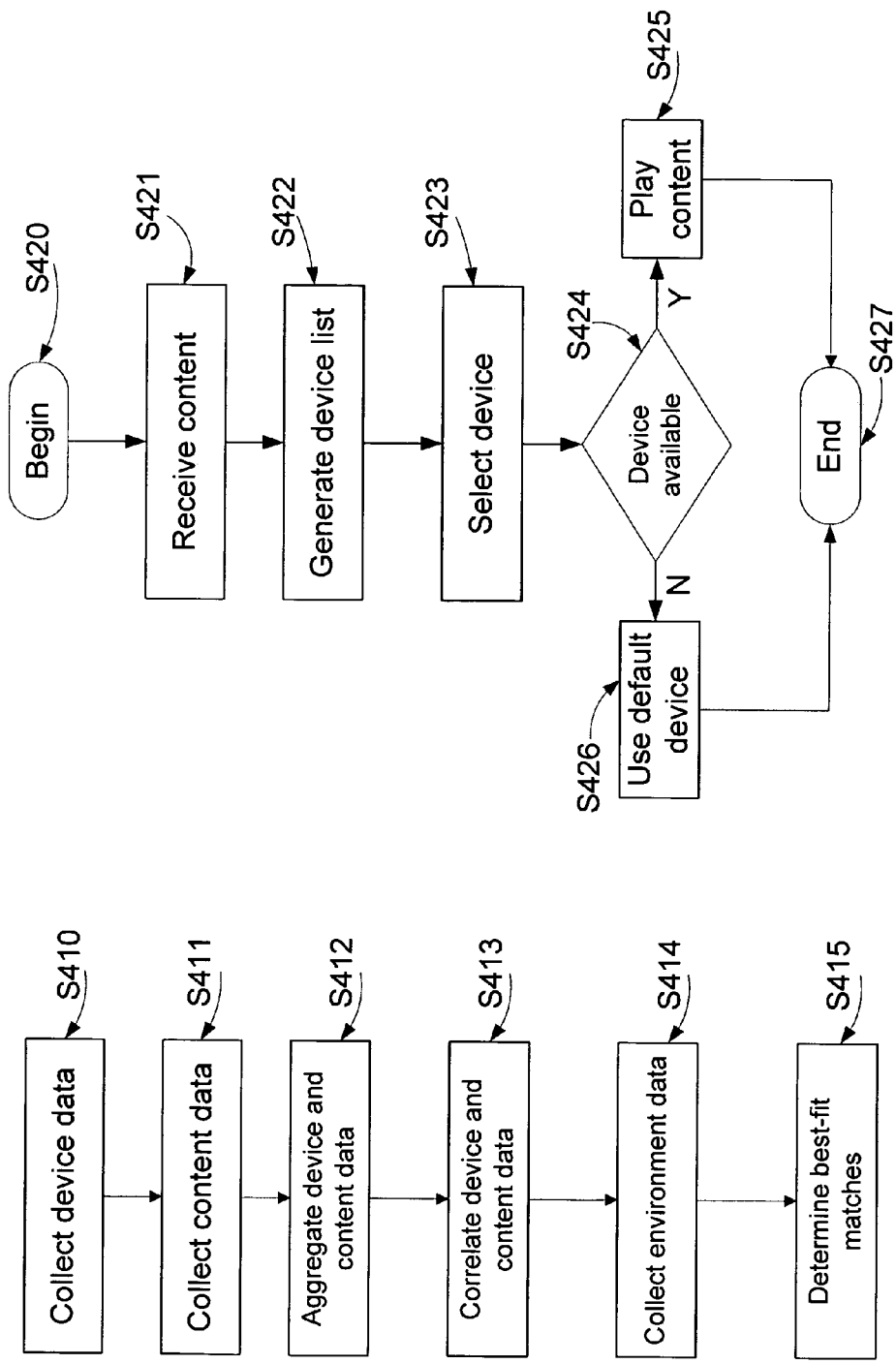
FIGS. 4A and 4B are flow diagrams of embodiments of the present invention that illustrates a method to determine best-fit matches, and a method to reproduce content.

FIGS. 4A and 4B are flow diagrams of embodiments of the present invention that illustrate a method to determine best-fit matches, and a method to reproduce content.

With reference to FIG. 4A, a mediator determines best-fit matches, which may be one or more devices in a network environment. The mediator, in S410, collects device data, which include attributes that describe the capabilities of each device, from the one or more devices in the network environment. In an alternate embodiment of the present invention, the device data is limited to a subset of the devices in the network environment. Device capabilities may describe the operational features of the device, which include information about optimal operating conditions, such a lighting information, volume information, etc. After receiving the device data, the mediator collects content data, in S411, which includes content metadata. The content data may include audio and video information, and the content metadata may describe optimal display and audio settings for reproducing the content, etc. The mediator, in S412-S413, aggregates and correlates the device and content data. The correlation enables the mediator to determine where to reproduce the content data. In S411, environment data, such as, for example, time of day, temperature, ambient light conditions, etc. is collected by the mediator. Using the environment data and the correlation data the mediator is able to dynamically select, best-fit matches, devices that are suitable to reproduce the content. Therefore, the mediator maximizes a user's experience by automatically adjusting device conditions to create a suitable audio and video experience for the user. The process ends in S415.

With reference to FIG. 7, the network environment 700 may implement the method of FIG. 4A to determine which set of speakers 715 or 720 are suitable to reproduce audio content. A mediator collects device data, which includes information about the blind devices 620, the wide screen television 710, the internal speakers 715 and the external speakers 720. A content source, such as, for example, a set-top box, may provide the mediator with content data. The content data and device data are aggregated and correlated to determine where to reproduce the content data. For example, the internal speakers 715 may be optimized to reproduce frontal sounds, sounds originating in the front of a user, while external speakers 720 are optimized to reproduce background sounds, sounds that come from behind the user. So, the mediator uses the correlated and aggregated data to select between the internal speakers 715 and the external speakers 720 to maximize audio sounds. Additionally, similar considerations are taken into account when reproducing video. A business rule may indicate that video content should be sent to a large display device, such as, for example, wide screen television 710, when multiple display devices (not shown) are present. The mediator selects the best display device to reproduce the video content by utilizing the correlated and aggregated data. Moreover, the mediator collects environment data to determine optimal lighting conditions when reproducing the audio or video content.

With reference to FIG. 4B, in an alternate embodiment of the present invention a mediator reproduces content based on the availability of network devices in a network environment. In S421, the mediator receives content from one or more content sources, and dynamically generates a user interface on a network device to display a content and device list, S422. The content list is a listing of content currently reproduced on network devices in the network environment. Also, when different content is received from the one or more content sources, the mediator generates correlations between the different content and provides the correlations and content list to the network device. The device list is a listing of all network devices that the mediator can control and automatically updates when a new device enters the network environment. After generating the device list, the mediator or a user selects a device from the device list suitable for reproducing content listed on the content list in S423. Subsequently, in S424 the availability of the device is checked. If the device is available, content is transferred to the device for reproduction, in S425; otherwise, a default device is selected to reproduce the content in S426. The process ends in S427.

With reference to FIG. 6, the network environment 600 implements the method of FIG. 4B to reproduce content based on device availability. Here, the display devices 630 may receive content from a content source local or external or the network environment 600. A mediator may control the light devices 610 to automatically dim, and the blind devices 620 to automatically close to create an environment suitable for displaying a night sky, including stars and a solar system on the display devices 630. The mediator determines that display devices 630 are reproducing different content, the night sky and the solar system, and generates correlations to indicate that the night sky and the solar system are related astronomy content. The correlations may include interactions that are triggered when related content is reproduced on display devices 640. The mediator automatically generates a user interface on the dynamic user interface device 640 that includes the correlations and a content list, such as, for example, a list of the planets, e.g. Mars, Neptune, etc. The user interface device 640 also includes a device list, which includes the light devices 610, the blind devices 620 and the display devices 630. The user interface device 640 may control, either automatically or with user intervention, the content reproduced on the display devices 630 and the ambient light produced by the light devices 610 and the blind devices 620. The mediator may utilize the correlations to automatically control the user interface device 640 to select which of the display devices 630 should reproduce the night sky. For instance, selecting Mars on the user interface device 640 triggers an interaction on the solar system to zoom-in on Mars and simultaneously utilizes the correlations to determine a constellation near Mars to trigger an interaction on the night sky to display constellation near Mars. Therefore, the display device 630 that displayed the night sky displays the constellations near Mars and the display device 630 that displayed the solar system displays Mars. A detailed discussion of the dynamic user interface device 640 is provided in co-pending application Ser. No. 10/743,312, entitled "System and method for sharing information based on proximity," which is herein incorporated by reference.

FIGS. 5A and 5B are flow diagrams of embodiments of the present invention that illustrate a method to resolve device contention and a method to resolve content contention.

With reference to FIG. 5A, best-fit devices are located when a new device enters a network environment. A mediator decides which device takes precedence according to prescribed business rules in S511, or a user may intervene to decide the device that should take precedence. Upon making this determination, the location of content reproduced on the device taking precedence is determined, in S512. In S513, a list of devices capable of reproducing the content is generated. The mediator, in S514, determines which of the devices are best-fit devices and proximate to the device having precedence. If the best-fit devices are not proximate, the closest devices capable of reproducing the content are selected in S516. Otherwise, in S515, the best-fit devices are selected. The process ends in S517.

Figure 8:
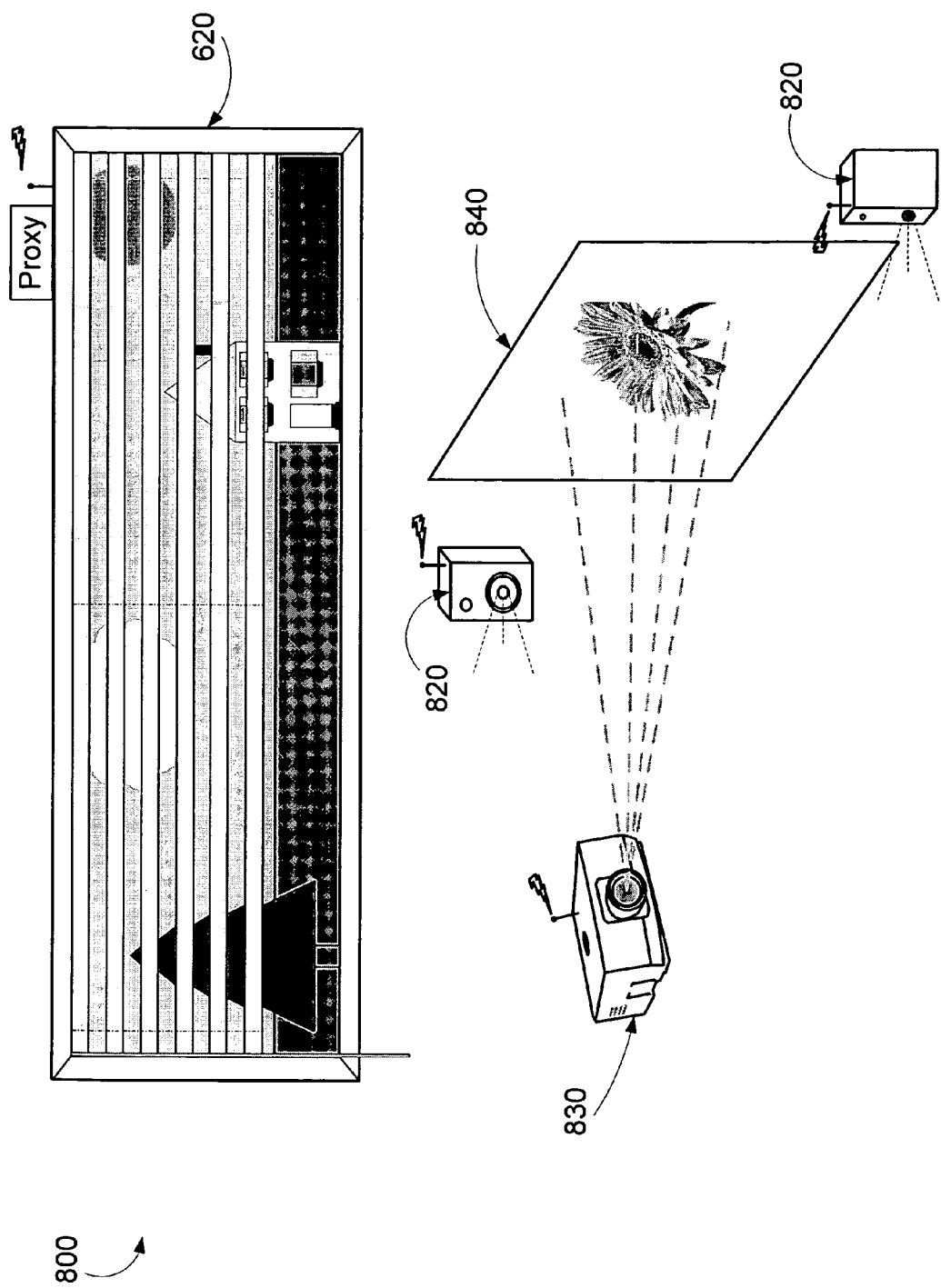
FIG. 8 is a network schematic that illustrates a network environment that streams content to a plurality of network devices.
Figure 9:
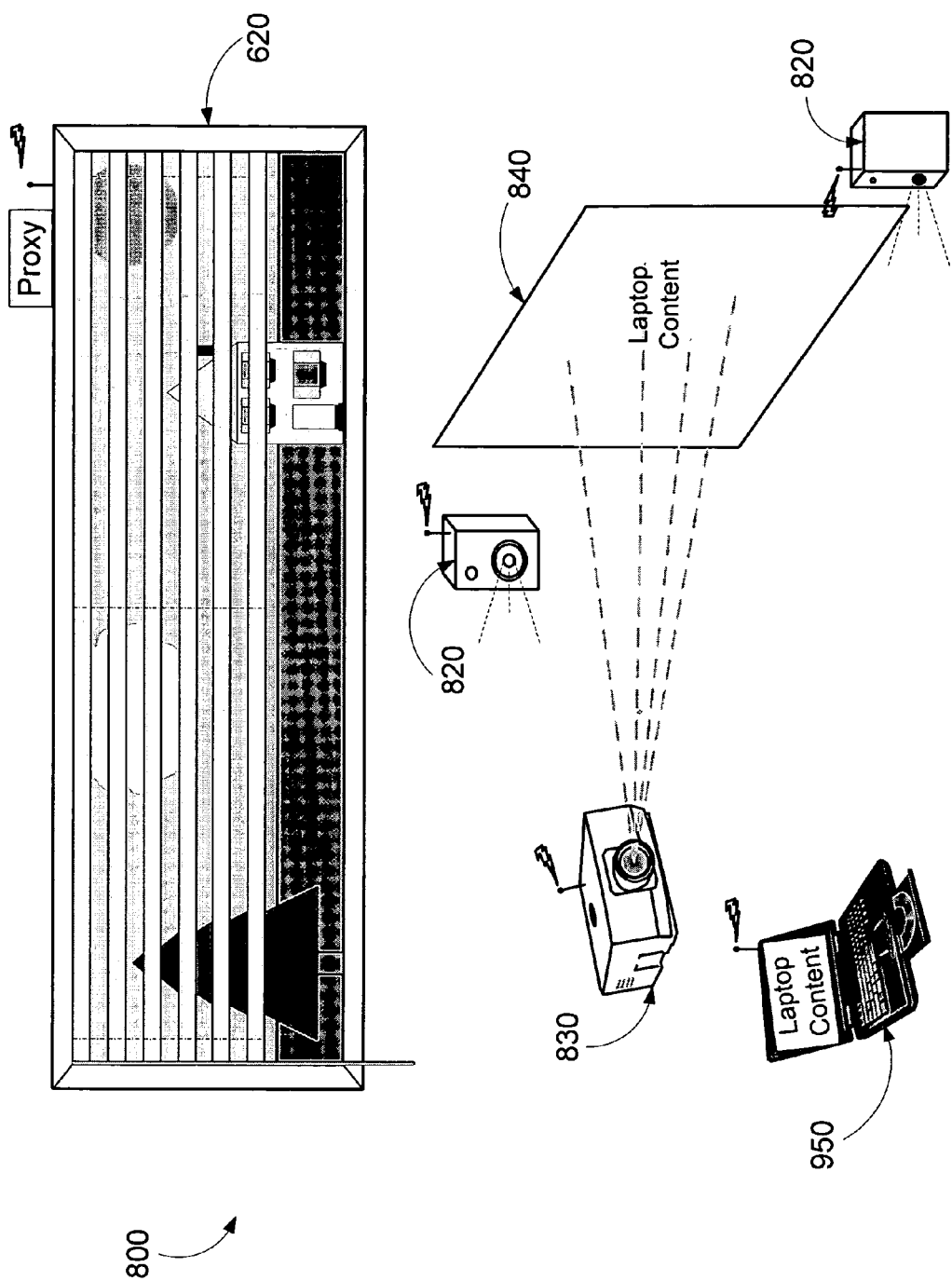
FIG. 9 is network schematic that illustrates how the network environment of FIG. 8 responds to a new device joining the network.

The method to resolve device contention enables a mobile device leaving an old network and entering into a new network to automatically synchronize with the other devices in the new network. With reference to FIGS. 8-9, a mediator in network environment 800 implements the device contention method of FIG. 5A, when, referring to FIG. 9, a new device 950 enters the network environment 800. Here, the content on the new device 950 is transmitted wirelessly to a display device 830 and speaker devices 820 because they are best-fit and proximate.

Referring to FIG. 8, the network environment 800 includes a blind device 620, the display device 830, speaker devices 820 and a screen device 840. The display device 830 receives streaming content from a content source external to the network environment 800. Referring to FIG. 9, when the new device 950, which reproduces content different from the display device 830, enters the network environment 800, the device contention method is initiated. The mediator determines whether the content on the new device 950 should take precedence over content currently reproduced by the display device 830. Here, a business rule may indicate that a new device entering the network has precedence. So, the content currently reproduced on the new device 950 should be reproduced on the display device 830. The mediator locates the content currently reproduced by the new device 950, generates a list of best-fit and proximate devices, which include the display device 830 and the speaker devices 820 and reproduces the content of the new device 950 on the best fit devices, the display device 830 and the speaker devices 820.

When multiple network devices, such as, the display device 830, the speaker devices 820 and the new device 950 are streaming the same content the mediator creates a parent child relationship between the devices. The device on the network from which the streaming content originates, the new device 950, is considered a parent and the other network devices, the speaker devices 820 and the display device 830, are children. Thus, stopping reproduction at a child network device, the speaker devices 820 or the display device 830, does not stop reproduction at the parent, the new device 950, whereas stopping reproduction at the parent, the new device 950, stops reproduction on all devices, the display device 830 and the speaker devices 820, related with the parent, the new device 950.

Moreover, in an alternate embodiment of the present invention, content can be mixed, combined or scripted to create a multimedia presentation. For example, a token promoting a particular artist may contain licenses and links to images, videos, songs and text for that artist. A detailed description of this technology is provided in co-pending application Ser. No. 11/048,203, entitled "System and method for distributing digital content over a network," which is herein incorporated by reference.

With reference to FIG. 5B, another embodiment of the present invention is a method to resolve content contention. A device, such as a display device having internal speakers in a wireless network environment, may receive two or more streams of content simultaneously. Here, the display device receives a content stream, in S521, from a first content source and a notification stream, in S522, which may be from a notification device, such as for example, a door bell or a second content source. The first and second content sources may be devices local or external to the network environment. The notification stream may be a video, an audio or a textual message. The mediator may automatically resolve all content contention or a user may be queried to resolve a specified subset of content contention. In S523, the mediator may determine whether the notification stream should be ignored, based on pre-configured business rules or based on values assigned, by the mediator, to the notification stream and the content stream. For example, a business rule may specify that a notification stream, received during a specified time period, be ignored. Accordingly, the mediator automatically ignores notification streams received during the specified time period. If the mediator receives the notification stream at a time outside of the specified time period, the mediator may compare a value assigned to the notification stream and a value assigned to the content stream to determine which stream is more important. Alternatively, the mediator may be pre-configured to query a user to resolve contention between content stored, originating, locally and content stored, originating, externally. In S523, if the mediator determines that the notification stream is assigned a large value, indicating high importance and should not be ignored, the notification stream is reproduced along with the content currently reproduced or replacing the content currently reproduced on the display device in S524. Additionally, when reproducing the notification stream the mediator may adjust the audio level or the display size of the notification stream according to the importance of the notification stream in S525 and S524. The process ends in S526.

In sum, embodiments of the present invention generate content-content, content-device relationships and device-device relationships and utilize the generated relationships to automatically create a suitable environment that maximizes a user's enjoyment when reproducing content. The foregoing descriptions of the invention are illustrative, and modifications in configuration and implementation will occur to persons skilled in the art. For instance, while the present invention has generally been described with relation to FIGS. 1-9, those descriptions are exemplary. Accordingly, the scope of the invention is to be limited only by the following claims.

We claim:

1. A computer-readable storage medium having computer-executable components, the computer-readable medium comprising:
   a ranking component to assign values, indicating importance, to content and a plurality of devices;
   a listening component to receive device offerings and content preferences and to compile the device offerings and the content preferences; and
   a control component to specify a level of user intervention when reproducing the ranked content based on the device offerings and content preferences received by the listening component.

2. The computer-readable medium according to claim 1, further comprising:
   an arbitration component to resolve device or content contention.

3. The computer-readable medium according to claim 2, wherein the arbitration component automatically selects a device to reproduce the content.

4. The computer-readable medium according to claim 3, wherein the arbitration component determines a precedence of the device using values assigned by the ranking component.

5. The computer-readable medium according to claim 2, wherein the arbitration component automatically selects content to be reproduced on a group of devices of the plurality of devices.

6. The computer-readable medium according to claim 1, wherein the ranking component assigns values based on business rules.

7. The computer-readable medium according to claim 1, wherein the level of user intervention is set to zero.

8. The computer-readable medium according to claim 1, wherein the listening component collects network environment data.

9. A computer-implemented method comprising:
   assigning, by a ranking component, values indicating importance to content and a plurality of devices;
   receiving, at a listening component, device offerings and content preferences and compiling the device offerings and the content preferences; and
   specifying, by a control component, a level of user intervention when reproducing the ranked content based on the device offerings and content preferences received by the listening component.

10. The computer-implemented method according to claim 9, further comprising:
    resolving, by an arbitration component, device or content contention.

11. The computer-implemented method according to claim 10, wherein a device to reproduce the content is selected by the arbitration component without user intervention.

12. The computer-readable medium according to claim 11, wherein a precedence of the device is determined by the arbitration component using values assigned by the ranking component.

13. The computer-implemented method according to claim 10, wherein a group of devices of the plurality of devices to reproduce the content is selected by the arbitration component without user intervention.

14. The computer-implemented method according to claim 9, wherein the values are assigned based on business rules.

15. The computer-implemented method according to claim 9, wherein the level of user intervention is set to zero.

16. The computer-implemented method according to claim 9, wherein network environment data is collected by the listening component.

17. A computer system having a processor and memory, the computer system further comprising:
    a ranking component configured to assign values, indicating importance, to content and a plurality of devices;
    a listening component configured to receive device offerings and content preferences and to compile the device offerings and the content preferences; and
    a control component configured to specify a level of user intervention when reproducing the ranked content based on the device offerings and content preferences received by the listening component.

18. The computer system according to claim 17, further comprising:
    an arbitration component to resolve device or content contention.

19. The computer system according to claim 17, wherein the arbitration component automatically selects a device to reproduce the content.

20. The computer-readable medium according to claim 19, wherein the arbitration component determines a precedence of the device using values assigned by the ranking component.

21. The computer system according to claim 18, wherein the arbitration component automatically selects content to be reproduced on a group of devices of the plurality of devices.

22. The computer system according to claim 17, wherein the ranking component assigns values based on business rules.

23. The computer system according to claim 17, wherein the level of user intervention is set to zero.

24. The computer system according to claim 17, wherein the listening component collects network environment data.

* * * * *

UNITED STATES PATENT AND TRADEMARK OFFICE
CERTIFICATE OF CORRECTION

| | | |
|---|---|---|
| PATENT NO. | : 7,366,972 B2 | Page 1 of 1 |
| APPLICATION NO. | : 11/117571 | |
| DATED | : April 29, 2008 | |
| INVENTOR(S) | : David W. Baumert et al. | |

It is certified that error appears in the above-identified patent and that said Letters Patent is hereby corrected as shown below:

In column 12, line 40, in Claim 19, delete "17," and insert -- 18, --, therefor.

Signed and Sealed this
Twelfth Day of April, 2011

David J. Kappos
*Director of the United States Patent and Trademark Office*